United States Patent
Dickinson (10) Patent No.: US 7,971,506 B2
(45) Date of Patent: Jul. 5, 2011

(54) AUTOMOTIVE ACCELERATOR PEDAL WITH ADAPTIVE POSITION KICK-DOWN DETENT

(75) Inventor: Mike Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 804 days.

(21) Appl. No.: 11/850,768

(22) Filed: Sep. 6, 2007

(65) Prior Publication Data
US 2009/0069155 A1    Mar. 12, 2009

(51) Int. Cl.
*G05G 1/38* (2008.04)

(52) U.S. Cl. .............. 74/512; 74/513; 74/527; 74/560; 200/61.89

(58) Field of Classification Search .............. 74/512, 74/513, 527, 560; 477/133, 136, 141; 200/61.89, 200/86.5, 16 A–16 D, 520
See application file for complete search history.

(56) References Cited

U.S. PATENT DOCUMENTS

| | | | |
|---|---|---|---|
| 4,316,065 A * | 2/1982 | Rupp et al. | 200/61.89 |
| 4,818,036 A * | 4/1989 | Reinecke | 303/50 |
| 5,162,625 A * | 11/1992 | Comerford | 200/61.89 |
| 5,563,355 A * | 10/1996 | Pluta et al. | 73/862.625 |
| 5,934,152 A * | 8/1999 | Aschoff et al. | 74/513 |
| 6,209,418 B1 | 4/2001 | Kalsi et al. | |
| 6,360,631 B1 * | 3/2002 | Wortmann et al. | 74/513 |
| 6,418,813 B1 | 7/2002 | Lewis | |
| 6,446,500 B1 | 9/2002 | Marquardt et al. | |
| 6,689,016 B2 | 2/2004 | Apel | |
| 6,805,022 B1 | 10/2004 | Steindl et al. | |
| 6,896,640 B2 | 5/2005 | Kurabayashi | |
| 6,955,103 B2 | 10/2005 | Crack | |
| 7,017,443 B2 | 3/2006 | Kalsi | |
| 7,066,049 B2 | 6/2006 | Reimann et al. | |
| 2005/0097980 A1 * | 5/2005 | Menzies | 74/512 |

FOREIGN PATENT DOCUMENTS

JP    2005-126022    5/2005

\* cited by examiner

*Primary Examiner* — Richard W Ridley
*Assistant Examiner* — Thomas Diaz
(74) *Attorney, Agent, or Firm* — Mark E. Duell; Rankin Hill & Clark LLP (57) ABSTRACT

An adaptive position kick-down detent mechanism for providing a force feedback to an operator of a vehicle through a drive-by-wire accelerator prior to the transmission performing a kick-down. The kick-down detent mechanism includes a plunger portion, a plunger driving device, and an elastic portion. The plunger portion is slidable within the plunger driving device and is biased by the elastic portion. An electronic control unit communicates a kick-down pedal position to the plunger driving device, which moves the plunger portion to the kick-down pedal position so that the force feedback is provided to the driver before the kick-down even as the kick-down pedal position changes during vehicle operation.

17 Claims, 5 Drawing Sheets

AUTOMOTIVE ACCELERATOR PEDAL WITH ADAPTIVE POSITION KICK-DOWN DETENT

BACKGROUND OF THE INVENTION

A drive-by-wire (DBW) throttle system is an automobile technology which severs the mechanical link between the accelerator pedal and the throttle. In place of the mechanical link, an electrical connection is provided. A typical DBW throttle system includes an accelerator pedal module, an electronic control unit (ECU), and an electronically controlled throttle module.

The accelerator pedal module serves as the driver's throttle control, where the driver depresses the pedal to signal a desired increase in power. An accelerator pedal is rotatably mounted along the driver's side floor and is movable from a starting position to an end position along an arc. The pedal being pushed towards the front of the vehicle (depressed), signals a desired increase in power by the driver.

The pedal position along the arc is translated into an electrical signal. The electrical signal is sent to the ECU, where the signal is received and used to calculate the optimum throttle plate opening. This calculation is made considering the parameters acting on the system, such as vehicle speed, wheel slip, and automatic transmission shifting status. The ECU instructs the electronically controlled throttle module, which opens the throttle plate as instructed.

One benefit of the DBW throttle system is that, by electronically controlling the throttle, the integration of additional features to the vehicle is simplified. These additional features include cruise control, stability control and others that require torque (throttle) management. The integration of these particular features is facilitated because the throttle in a DBW throttle system can be moved irrespective of the position of the accelerator pedal.

Early DBW throttle systems were criticized for overruling driver decisions, however modern applications focus on making the vehicle power-train characteristics seamlessly consistent. Several of the improvements relating to the DBW throttle systems are directed to giving the driver a more natural driving feel.

One such improvement is directed to the situation where a pedal depression requires a substantial increase in power and therefore triggers an automatic transmission to downshift or "kickdown". Advances in DBW systems relate to giving the driver a feel for when a kick-down is going to occur. In this regard, devices known as kick-down mechanisms have been installed in DBW throttle systems as a means of providing a force feedback prior to a kick-down and thereby notifying a driver of a pending kick-down.

In addition to providing a more natural driving feel for a driver, a kick-down mechanism provides other benefits. The force feedback provided prior to a kick-down allows the driver to decide whether or not to continue to depress the pedal and trigger the kick-down or down shift. Avoiding a kick-down allows the transmission to maintain a higher gear ratio for a longer period of time, providing fuel economy benefits.

A conventional kick-down mechanism uses a kick-down detent situated in a position near the end of pedal travel. The kick-down is fixed at this position and, once contacted by the accelerator pedal, requires the driver to exert an additional force to overcome the detent. The additional force provides the driver with the force feedback which serves as notice to the driver that the automatic transmission is about to perform a downshift.

A problem exists with conventional kick-down mechanisms in that the kick-down detent is in a fixed position. As road and driving conditions vary, the pedal position at which a kick-down occurs will change. While the end position of pedal travel can be a good estimation of a kick-down pedal position, conventional kick-down mechanisms fail to provide the driver with a kick-down feel when the kick-down occurs prior to the end pedal position, such as may occur at lower speeds. Therefore a need exists for a kick-down mechanism which accurately provides the driver with a kick-down feel regardless of the pedal position at which the kick-down occurs.

SUMMARY OF THE INVENTION

The present invention is directed toward an apparatus and method for an adaptive position kick-down detent mechanism. As driving conditions vary, the ECU adjusts the pedal position at which a kick-down will occur. As the pedal position is adjusted, the ECU sends a control signal to the adaptive position kick-down detent mechanism to position the detent at a position corresponding to the kick-down pedal position. The adaptive position kick-down detent mechanism thus adjusts the position at which a force feedback is provided to a driver so as to correspond to a variable kick-down pedal position.

According to the present invention, an adaptive position kick-down detent mechanism includes a base portion, a plunger portion, and an elastic member. The plunger portion is received within the base portion and is therein connected and biased by the elastic member. A plunger driver is provided for laterally moving the plunger portion relative to the base portion, thereby positioning the plunger portion at a kick-down pedal position.

There are several means for adjusting the position of the plunger. According to one embodiment of the present invention, an adaptive position kick-down mechanism is provided wherein the base portion contains a linear solenoid, wherein the linear solenoid serves as the plunger driver. The linear solenoid is connected to an electronic control unit (ECU), which sends an electric current to the linear solenoid. A magnetic field is thereby generated, the magnetic field exerting a lateral force on the plunger portion, moving the plunger to a kick-down pedal position. The ECU, based on operating conditions and in view of the characteristics of electromagnets and the composition of the elastic member, sends an appropriate amount of current to the linear solenoid so as to correctly position the plunger.

According to a second embodiment of the present invention, the plunger of the adaptive position kick-down detent is positioned by a motor that linearly drives a rack. The rack has teeth that mesh with a pinion disposed on the motor shaft so as to translate the motor rotation into lateral movement of the rack. The rack is connected at a distal end to the plunger portion. As assembled, the rack and the plunger portion move integrally with one another to permit re-positioning of the plunger portion. The motor operation is controlled by the ECU so as to position the plunger in the kick-down pedal position.

According to a third embodiment of the present invention, the plunger of the adaptive position kick-down detent is positioned by a screw drive and a screw shaft. The screw shaft is in threaded engagement with the screw drive at a proximate end and is connected to the plunger portion at a distal end. As the screw shaft is rotated and moved laterally by the screw drive, the plunger portion moves integrally with the screw shaft.

According to a sub-assembly of the present invention, a modified plunger allows for a spring-loaded plunger tip to be movable relative to a plunger shaft, thereby providing a detent function within the plunger itself. Further, the plunger portion includes elastic detents attached to the subcomponents. The detents are disposed so as to require a breakthrough force be exerted in order to move the plunger tip relative to the plunger shaft.

A method according to the present invention for providing a force feedback prior to a kick-down through a drive-by-wire accelerator pedal is also provided. The method includes the steps of determining a pedal position at which a kick-down will occur, positioning the kick-down detent member at the kick-down pedal position, and biasing the kick-down detent member in a direction opposite to the direction of pedal depression so as to add a resistance to the pedal motion.

According to another aspect of the present invention, a method for reducing throttle variation in a drive-by-wire throttle system when transitioning from cruise control operation to normal manual operation by providing a force feedback through an accelerator pedal is provided. The method includes the steps of determining a pedal position corresponding to cruise control operation during cruise control operation, positioning a detent member at the determined pedal position, the detent member being biased in a direction opposite to a direction of pedal depression so as to resist pedal depression beyond the determined pedal position, depressing the accelerator pedal until said resistance is experienced, and deactivating cruise control operation.

DETAILED DESCRIPTION OF THE INVENTION

The invention will be described in accordance with its preferred embodiments, and as illustrated in the figures. The description with reference to the figures is intended to simplify the explanation of the invention and is not meant to limit the scope of the invention.

Figure 1A:
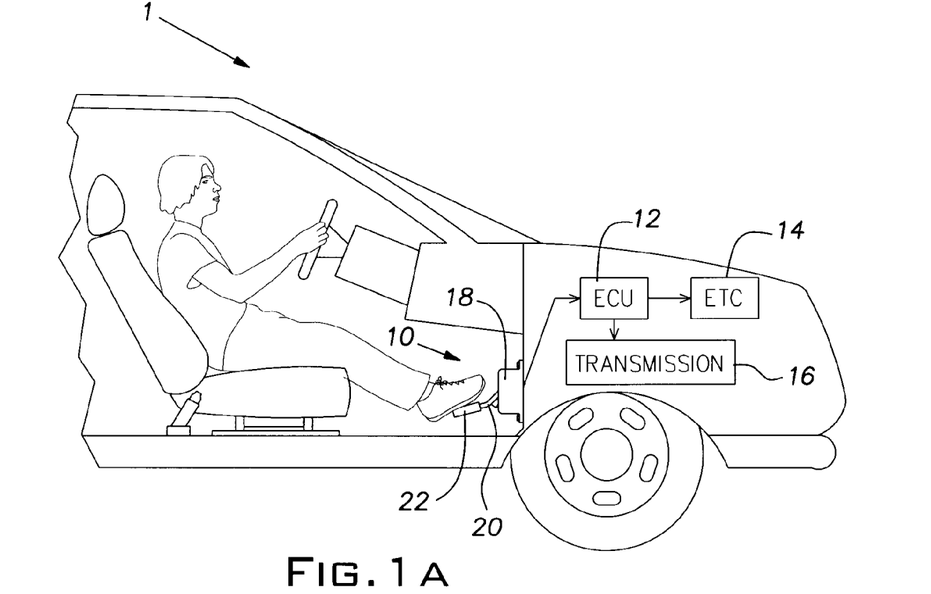
FIG. 1A is a schematic side view of a vehicle having a pedal assembly of the present invention.

With reference to FIG. 1A, a general view of a drive-by-wire (DBW) throttle system within a vehicle 1 is shown. The DBW throttle system includes an accelerator pedal module 10, an electronic control unit (ECU) or controller or control portion 12, an electronic throttle control unit 14, and a transmission 16.

Figure 1B:
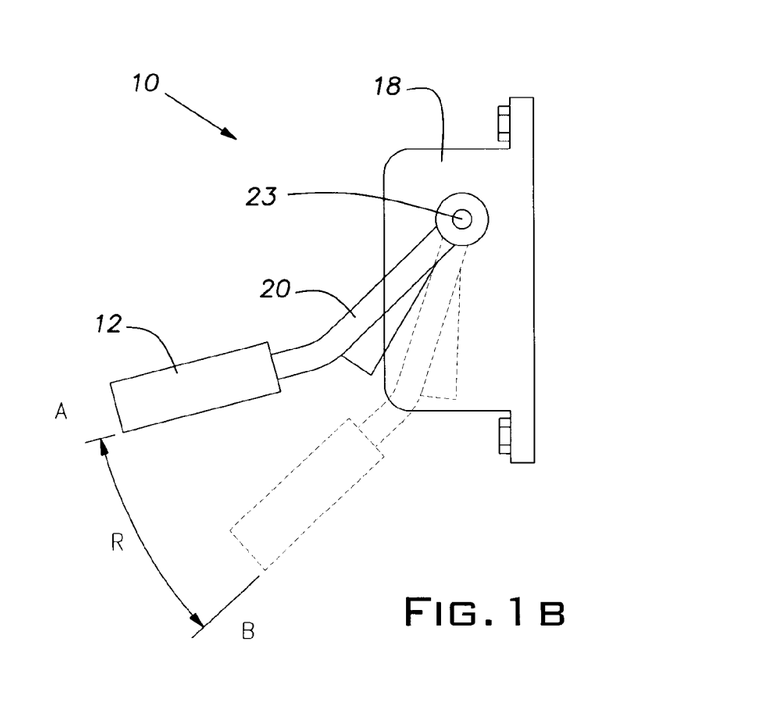
FIG. 1B is a schematic side elevational view of the pedal assembly.

The accelerator pedal module 10 is situated on the floor portion of the driver's side of the vehicle 1, immediately below the steering wheel. The accelerator pedal module includes a pedal housing 18, a pedal arm 20, and a pedal pad 22. As shown in FIG. 1B, the pedal arm 20 is pivotably mounted at a proximate end of the pedal arm 20 within the pedal housing 18 by a pivot pin 23. The pedal arm 20 is movable between a resting position A and an end position B along an arc R. A spring (not shown) situated within the pedal housing 18 biases the pedal arm 20 towards the start position A. The pedal pad 22 is mounted on the distal end of the pedal arm 20.

The accelerator pedal module 10 is electrically connected to the ECU 12. As the pedal arm 20 is depressed by the driver, the pedal position along the arc R is translated into an electrical signal that is sent to the ECU 12.

The ECU 12 calculates the optimum throttle plate opening based on the pedal arm 20 depression and other operating parameters. An illustrative list of the operating parameters includes: vehicle speed, wheel slip, and automatic shifting status. The ECU 12 then commands the electronic throttle control unit 14 to adjust the throttle plate opening through an electrical connection.

When the ECU 12 determines that a substantial increase in power is required, the ECU 12 will instruct the transmission 16 to perform a kick-down. As the operating parameters change during vehicle operation, the pedal arm 20 position at which the ECU 12 will trigger a kick-down will change. Accordingly, and as will be apparent from the following discussion, the present invention provides an apparatus and method that allows a kick-down mechanism 30 to provide a kick-down feel to the driver prior to the kick-down, regardless of the pedal position at which the kick-down will occur.

Figure 2:
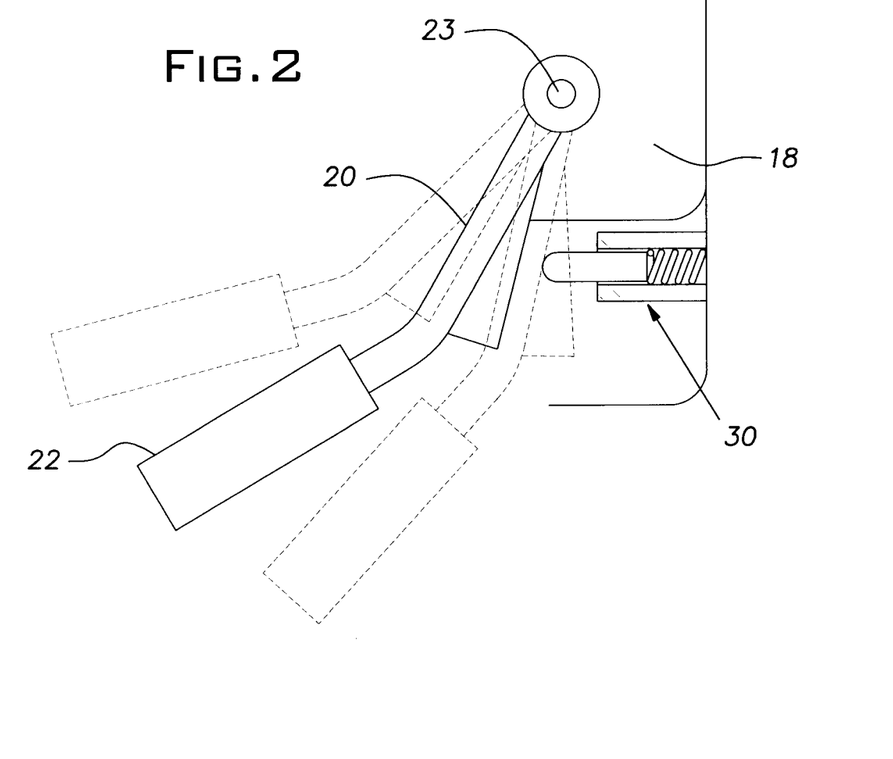
FIG. 2 is a schematic cross-sectional view of a general embodiment of the pedal assembly of the present invention.

With reference to FIG. 2, an illustrative example of a pedal housing 18 having a kick-down mechanism 30 is shown. The kick-down mechanism 30 is disposed within the pedal housing 18. The kick-down mechanism 30 is shown attached to a front wall 26 of the pedal housing 18, however the kick-down mechanism 30 can be otherwise situated within the pedal housing 18. The kick-down mechanism 30 has a base portion 31, a plunger 32, and an elastic member 33. The plunger 32 is slidably movable within the base portion 31. The elastic member 33 biases the plunger 32 towards the pedal arm 20. Additionally, a moving means (not shown) is present in the system so as to laterally move the plunger 32 either toward or away from the pedal arm 20. The moving means can take many different forms, as will become apparent with the description provided below. The moving means moves the plunger 32 to a position corresponding to the kick-down pedal position. As such, the pedal arm 20 must contact and move the plunger 32, which is biased against further pedal arm 20 depression, prior to reaching the kick-down pedal position.

As the pedal arm 20 is depressed (moved towards the front of the vehicle 1 and the kick-down mechanism 30), the ECU 12 responds to the signal received from the pedal module 10. In addition to instructing the electronic throttle control unit 14 to adjust the throttle plate opening, the ECU 12 determines the pedal arm 20 position at which a kick-down will occur. According to the present invention, once the kick-down pedal position is determined, the ECU 12 will position the plunger 32 of the kick-down mechanism 30 at a lateral position relative to the base portion 31 corresponding to the pedal arm 20 position at which kick-down occurs.

The kick-down pedal position is continuously calculated by the ECU 12 during vehicle 1 operation, and the kick-down mechanism 30 adjusts the plunger 32 position control based on signals received from the ECU 12. Thus, the position of the kick-down mechanism plunger 32 continuously adapts to changing conditions and kick-down pedal positions.

The kick-down mechanism 30 can take two general forms: either a persistent added resistance mechanism or a breakthrough mechanism. The persistent added resistance mechanisms will impart a continuous added resistance to pedal depression beyond the kick-down pedal position. The breakthrough mechanisms require a break-through force to get past the kick-down pedal position. Once the break-through force is overcome, the effort required to depress the pedal further substantially returns to that of the effort required prior to reaching the kick-down pedal position. The present invention is amenable to both varieties of kick-down mechanisms.

Figure 3:
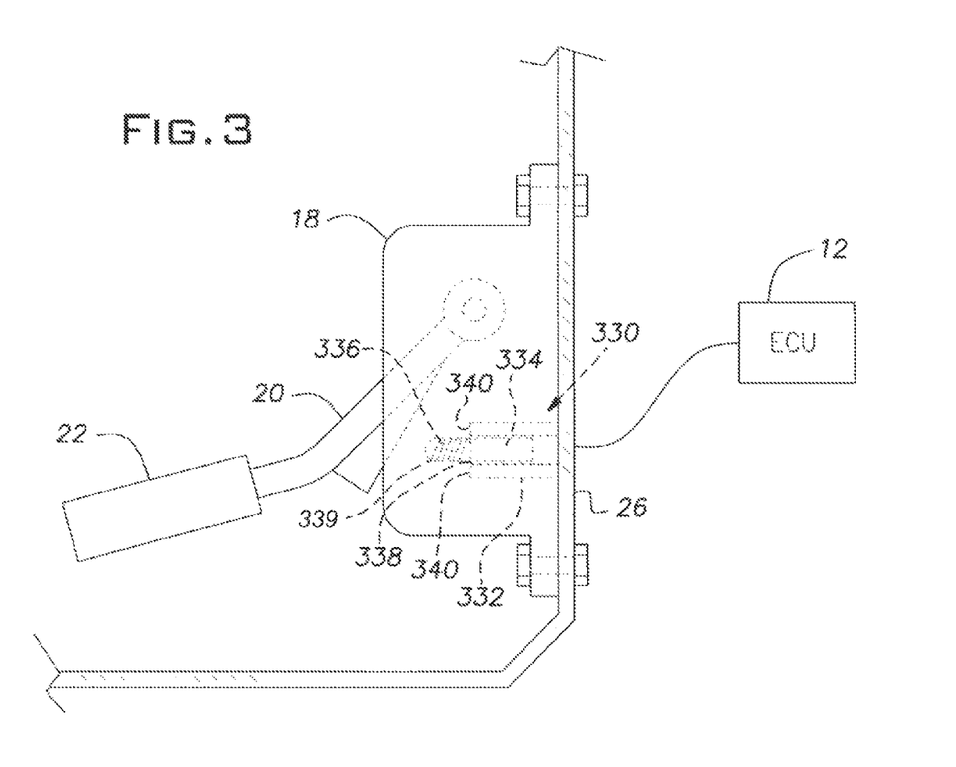
FIG. 3 is a schematic cross-sectional view of the present invention utilizing a linear solenoid.

With reference to FIG. 3, a persistent added resistance kick-down mechanism 330 is shown. The kick-down mechanism 330 is secured to a wall 26 nearest the front of the vehicle 1 within the pedal housing 18. The kick-down mechanism 330 includes a linear solenoid or housing 332, a plunger 334, and a coil spring 336. The linear solenoid is affixed to the pedal housing 18 front wall 26 and defines an opening 338 facing the pedal arm 20. The opening 338 has a circular cross-section that extends the length of the linear solenoid 332.

The plunger 334 is generally cylindrical in shape, has a tapered head with a lip 339 facing the pedal arm 20, a flat end facing the front of the vehicle 1, and an outer circumference smaller than an inner circumference of the linear solenoid opening 338. As such, the plunger 334 is slidably movable within the opening 338 of the linear solenoid 332.

The coil spring 336 is connected at a distal end with the lip 339 of the plunger 334 end facing the pedal arm 20. The lip 339 is formed so as to provide an engagement surface for the coil spring 336. Such a surface can be formed by providing an elevated ridge on the end of the plunger 334. With the present embodiment, the coil spring 336 engages the lip 339 so as to be able to resist motion of the plunger 334 in both lateral directions. This is necessary so as to provide resistance to the depression of the pedal arm 20 and to prevent the linear solenoid 332 from completely expelling the plunger 334. A proximate end of the coil spring 336 engages a vertical wall 340 of the linear solenoid. With this construction, the coil spring 336 resists movement of the plunger 334 towards the front of the vehicle 1 and movement of the plunger 334 towards the pedal arm 20 by resisting compression and extension, respectively.

In operation, the ECU 12, responding to the operating conditions and the pedal arm 20 depression, calculates the pedal arm 20 position at which kick-down will occur. Based on this calculation, the ECU 12 sends a control signal to the linear solenoid 332 causing the linear solenoid 332 to position the plunger 334 at the kick-down pedal position. The plunger 334 is moved in a lateral direction, either towards or away from the pedal arm 20, by the linear solenoid 332. The lateral movement of the plunger 334 results from the ECU 12 varying an electric current being sent to the linear solenoid 332. As the electric current passes through the linear solenoid 332, a magnetic field is generated. The magnetic field exerts a force in a lateral direction along the opening 338 of the linear solenoid. The lateral force exerted by the magnetic field acts on the plunger 334, moving the plunger 334 laterally. As the current is changed, the magnetic field changes, and the plunger 334 is moved either toward or away from the pedal arm 20.

When the plunger 334 is positioned in the kick-down pedal position, an added force is required for the driver to depress the pedal arm 20 past the kick-down pedal position. The pedal arm 20 must overcome the force required to compress the coil spring 336 and the electromagnetic force holding the plunger 334 in place to further depress the plunger 334. This additional force imparts a force feedback to the driver, notifying the driver that a kick-down (down shift) is about to occur. The amount of force feedback provided to the driver can be adjusted by altering the coil spring 336. Once the pedal arm 20 is depressed past the kick-down pedal position, the added force required to further depress the pedal arm 20 remains present until the pedal arm 20 is returned towards or to the resting position A.

Figure 4A:
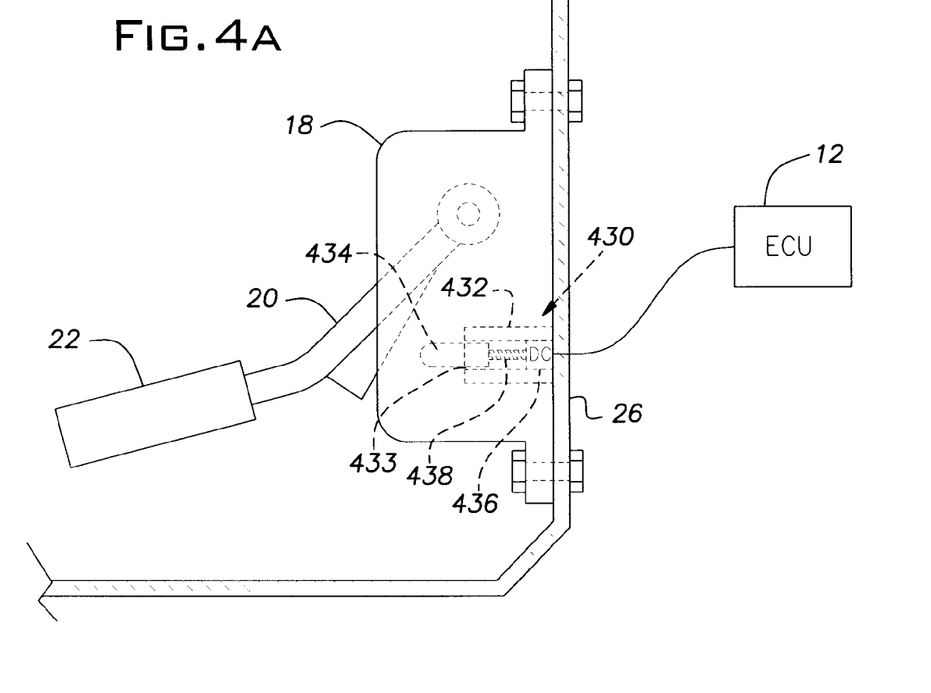
FIG. 4A is a schematic cross-sectional view of the present invention utilizing a DC motor.
Figure 4B:
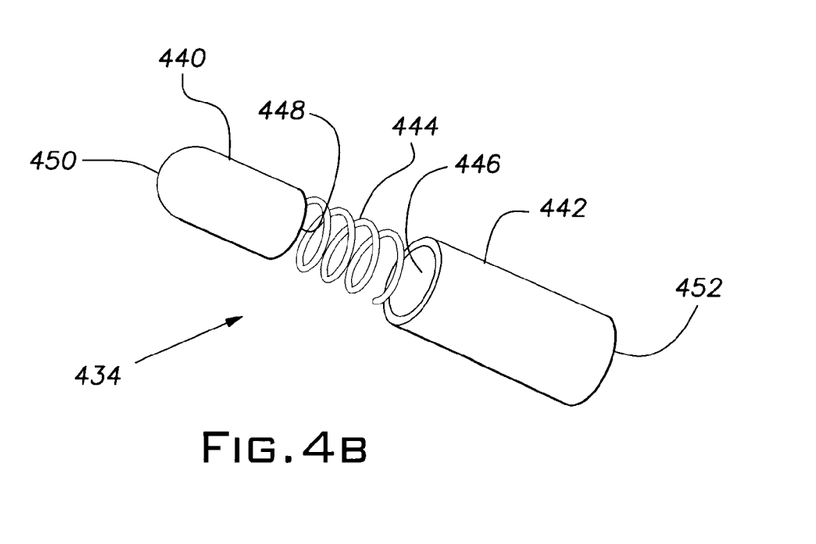
FIG. 4B is an exploded perspective view of the plunger shown in FIG. 4A.

With reference to FIGS. 4A and 4B, a persistent added resistance kick-down mechanism 430 utilizing a motor 436 and a rack 438 is shown. In this embodiment, the kick-down mechanism 430 includes a kick-down cylinder or housing 432, a plunger 434, a motor 436, and a rack 438. The kick-down cylinder 432 is attached to the front wall 26 of the pedal housing 18. The kick-down cylinder 432 defines an opening 433 at a distal end facing the pedal arm 20. The opening 433 has a generally circular cross-section and extends along the length of the kick-down cylinder 432. The motor 436 is attached at a proximate end of the opening 433 adjacent to the front wall 26 of the pedal housing 18, and includes a pinion (not shown).

The rack 438 is generally rectangular in shape and is extended or retracted by the driving action of the motor 436 and motor pinion. To achieve the extension and retraction of the rack 438, the pinion teeth meshingly engage with the teeth provided by the rack 438, and the rack is driven back and forth past the pinion by rotation of the motor 436. Thus, as the motor 436 rotates the motor shaft, the rack 438 is driven in a lateral direction so as to be either extended or retracted. Through this interaction, the rotational motion of the motor 436 is translated into lateral movement by the rack 438.

To enable the lateral motion, the motor 436 defines a hole having an inner circumference greater than an outer circumference of the rack 438 and a depth sufficient to allow the required lateral movement of the rack 438. Thus, to retract the rack 438, the motor 436 rotates in a reverse direction and draws more of the rack 438 into the opening, and extension is achieved by rotating in a forward direction and thus pushing the rack 438 out of the opening. The motor 436 is electrically connected to, and controlled by, the ECU 12.

The plunger 434 has a generally circular cross-section with an outer circumference smaller than the inner circumference of the opening 433 in the kick-down cylinder 432. The plunger 434 includes a plunger tip 440, a plunger shaft 442, and a coil spring 444. The plunger shaft 442 has a generally circular cross-section, is hollow, and has one open end 446 and one closed end 452. The closed end 452 of the plunger shaft 442 is the end facing the front of the vehicle 1. The open end 446 of the plunger shaft 442 faces the pedal arm 20.

The plunger tip 440 is generally bullet shaped, having a tapered head 450 and a flat end 448. The outer circumference of the plunger tip 440 is smaller than the inner circumference of the plunger shaft 442. The plunger tip 440 is adapted to be slidably received within the plunger shaft 442. The flat end 448 faces the front of the vehicle 1, and the tapered end 450 faces the pedal arm 20.

The flat end 448 of the plunger tip 440 attaches to a distal end of the coil spring 444. The coil spring 444 is also attached, at a proximate end, to the wall 448 of the plunger shaft 442. As such, the plunger tip 440 is spring mounted within the plunger shaft 442 with a portion of the plunger tip 440 extending out of the plunger shaft 442 towards the pedal arm 20. As a force is exerted on the tapered end 450 of the plunger tip 440, the plunger tip 440 is pushed further into the plunger shaft 442. The coil spring 444 biases the plunger tip 440 towards the pedal arm 20, so that when the force is removed from the plunger tip 440, the plunger tip 440 will return to being fully extended from the coil spring 444.

The plunger 434 is slidably received within the opening 433 of the kick-down cylinder 432 and is attached to the rack 438 at the plunger end 452 facing the front of the vehicle 1. As such, the plunger 434 moves integrally with the rack 438 as the motor 436 extends and retracts the rack 438.

The operation of the embodiment shown in FIGS. 4A and 4B will herein be explained. As the vehicle 1 is operated, the ECU 12 determines the pedal position at which a kick-down will occur. The ECU 12 will then send a control signal to actuate motor 436 rotation in either a forward or reverse direction to extend or retract the rack 438 to the kick-down pedal position. As the rack 438 moves linearly, the plunger 434 is integrally moved so as to be placed in the kick-down pedal position.

When the pedal arm 20 contacts the plunger 434 at the plunger end 450, the coil spring 444, which biases the plunger tip 440 towards the pedal arm 20, provides a resistance to the continued depression of the pedal arm 20. This increased resistance provides the driver with a force feedback indicating that a kick-down is about to occur. Once again, the amount of force feedback supplied to the driver can be adjusted by changing the spring strength of the coil springs 444.

As the pedal arm 20 is depressed beyond the kick-down pedal position, the coil spring 444 compresses further, and the plunger tip 440 is pushed further into the plunger shaft 442. Accordingly, as the pedal arm 20 is depressed beyond the kick-down pedal position, the length of the plunger 434 is reduced as the plunger tip 440 is pushed into the plunger shaft 442. Further, the increased resistance to pedal arm 20 depression will remain until the pedal arm 20 is returned to the resting position A. Once the force exerted towards the front of the vehicle 1 by the pedal arm 20 is removed from the plunger 434, the coil spring 444 extends and pushes the plunger tip 440 towards the pedal arm 20 to a resting position.

Figure 5A:
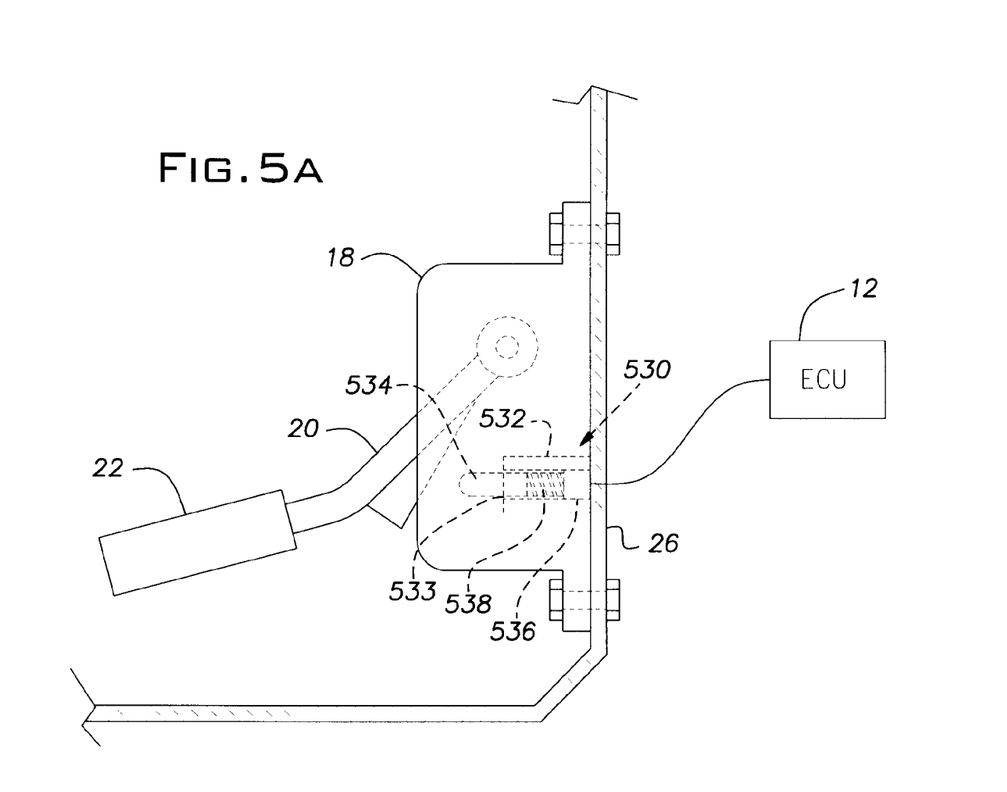
FIG. 5A is a schematic cross-sectional view of the present invention utilizing a screw drive.
Figure 5B:
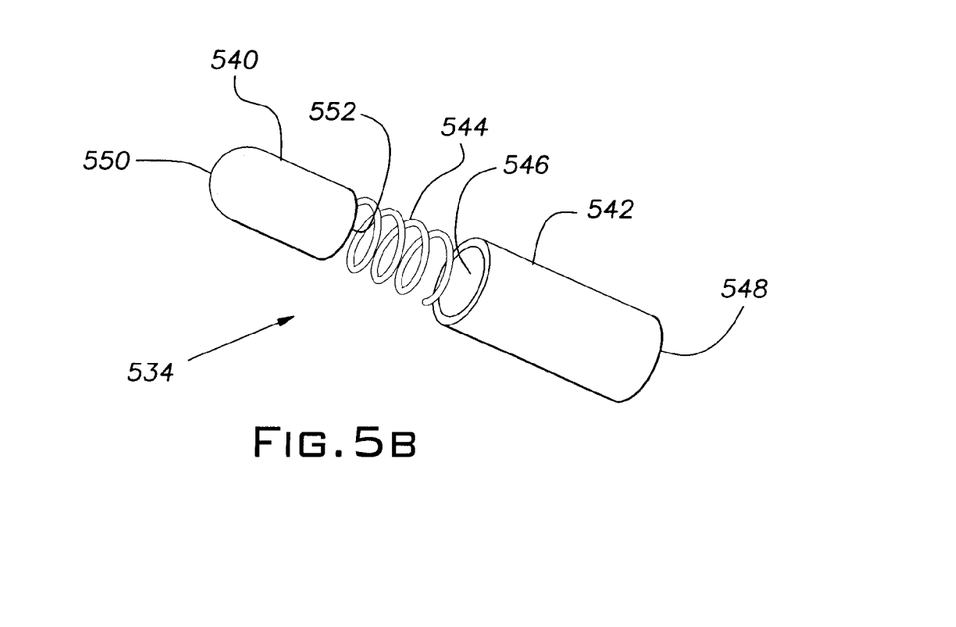
FIG. 5B is an exploded perspective view of the plunger shown in FIG. 5A.

With reference to FIGS. 5A and 5B, an embodiment of the present invention utilizing a screw drive to move a plunger portion 534 is shown. The structure and operation of the present embodiment is similar to that of the embodiment shown in FIGS. 4A and 4B, the only difference being the mechanism used to move the plunger 534. Accordingly, the description of the embodiment shown in FIGS. 5A and 5B will focus on the operation of the screw drive.

The kick-down mechanism 530 adjusts the position of the plunger 534 through the screw drive. The screw drive includes a motor 536 and a screw shaft 538. The motor 536 is mounted in the same manner as the motor 436 in FIG. 4A. The screw shaft 538 extends from the motor 536 and engages the plunger 534 in a similar manner as the rack 438 engages the plunger in FIG. 4A. The plunger 534 is constructed in the same manner as the plunger 434 shown in FIG. 4B.

The plunger end 548 facing the front of the vehicle 1 is attached to a distal end of the screw shaft 538. A proximate end of the screw shaft 538 is in threaded engagement with the motor 536. The motor 536 rotates the screw shaft 538 to induce lateral movement. As the screw shaft 538 is rotated, a lateral movement is achieved through the threaded interaction of the screw shaft 538 with the motor 536. As the screw shaft 538 moves laterally, the plunger 534 is also rotated and moved laterally. The operation of the embodiment of FIG. 5A is otherwise the same as the operation of the embodiment of FIG. 4A.

It is considered apparent to one skilled in the art that this invention includes variations of the above described persistent added force kick-down mechanisms. While not every variation is described in detail, all variations are considered to be within the scope of the invention.

Figure 6:
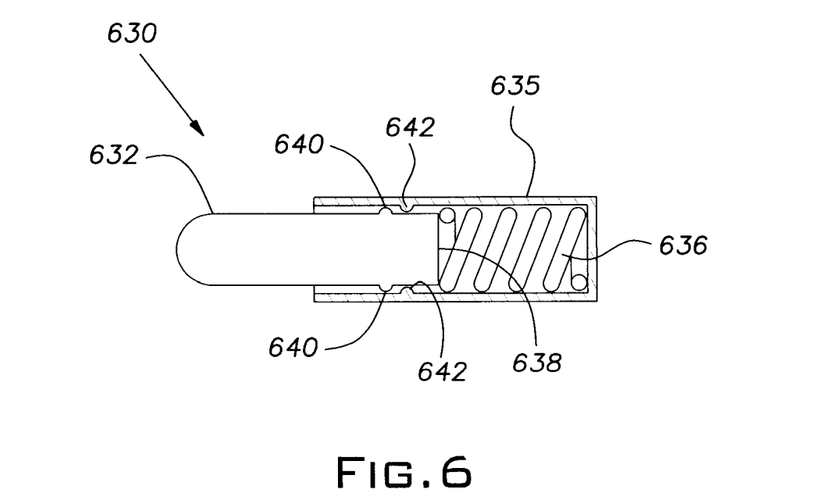
FIG. 6 is a cross-sectional view of a plunger assembly for use with an alternate embodiment.

With reference to FIG. 6, a breakthrough kick-down mechanism is illustrated. In this embodiment, the breakthrough mechanism is simply provided by modifying the plunger 630. The plunger 630 includes a plunger tip 632, a plunger shaft 634, and a coil spring 636. Additionally, the plunger tip 632 includes tip detents 640 disposed on the sides of the plunger tip 632. The plunger shaft 634 includes shaft detents 642 disposed on the inner wall of the plunger shaft 634; the shaft detents 642 disposed so as to positionally correspond with the tip detents 640. Alternatively, one or both of the tip detents 640 and or the shaft detents 642 could be an annular rim or ring. Such an assembly could simplify the assembly of the plunger 630 since there would no longer be a need to position the detents 640, 642 with respect to one another. The components are otherwise assembled in the same manner as the plunger of FIGS. 4B and 5B, described above.

As assembled, the interaction of the tip detents 640 and the shaft detents 642 cooperate to resist the motion of the plunger tip 632 as it is pushed further into the plunger shaft 634. For the tip detents 640 to move past the shaft detents 642, elasticity must be provided for in at least one sub-component. The elasticity can be present in any combination of: the tip detents 640, the shaft detents 642, the plunger tip 632, or the plunger shaft 634.

Once the tip detents 640 move beyond the shaft detents 642, the motion of the plunger tip 632 within the plunger shaft 634 is only resisted by the coil spring 636. Accordingly, a breakthrough feel is given where the resistance to the motion of the plunger tip 632 peaks as the tip detents 640 pass the plunger detents 642.

In operation, upon depression, the pedal arm 20 contacts the plunger tip 632, forcing the tip detents 640 into contact with the shaft detents 642. The contact between the detents 640,642 requires an additional force to be exerted on the pedal arm 20 so as to force the plunger tip 632 to overcome the detent effect and travel further into the plunger shaft 634. Once the additional force is applied and the tip detents 640 move past the shaft detents 642, the force to continue to depress the pedal arm 20 is reduced. This embodiment thereby provides a breakthrough force, wherein the force to achieve the pedal position leading to a kick-down peaks at the kick-down pedal position.

In contrast to the persistent added resistance embodiments described above, the coil spring 636 is not primarily responsible for providing resistance to pedal motion. Rather, the resistance is provided from the added difficulty of pushing the tip detents 640 past the shaft detents 642. Thus, to provide a true breakthrough feel to the plunger 630, the coil spring 636 should provide a minimal resistance. To return the pedal depression effort to a level close to that prior to contacting the plunger tip 632, the biasing force provided by the coil spring 636 should push the plunger tip 632 towards the pedal arm 20 with just enough force to allow the tip detents 640 to move past the shaft detents 642.

It is considered apparent that the invention is amenable to other forms of breakthrough mechanisms. While other variations will not be described in detail, one skilled in the art could recognize that the detents of the embodiment shown in FIG. 6 could easily be placed on the outside of a plunger mechanism so as to align with detents placed on the inner circumference of the base in which the plunger is received.

Additionally, one skilled in the art recognizes that while the embodiments have been described relatively specifically, features of the several embodiments can be interchanged while still arriving at the present invention. Further, other means for applying an added resistance and for moving and mounting the kick-down mechanism are considered within the scope of the present invention.

It is also considered apparent that the present invention is amenable to uses other than being a force feedback device for a driver prior to a kick-down. Any DBW throttle system application concerned with either providing a force feedback to a driver or with adjusting a pedal position can utilize the present invention. An example of one such use of the present invention relates to the cruise controlled operation of a vehicle with a DBW throttle system.

In contrast to a cable driven vehicle, the ECU 12 can control the throttle without any actual pedal depression. Thus, when the vehicle 1 is in cruise control operation, the pedal arm 20 is in the start pedal position A. Therefore, during cruise control operation with a DBW throttle system, the driver has very little positive feedback as to the equivalent accelerator pedal position because the ECU 12 is controlling the throttle directly. However, once the driver cancels cruise control operation to return to manual accelerator pedal operation, the driver must estimate the pedal arm 20 position resulting in a smooth transition. It may be difficult for the driver to estimate the pedal position corresponding to the throttle opening at the time of cruise control cancellation and a misestimation results in abrupt changes in speed and driveline shock.

The present invention provides a force feedback at the accelerator pedal position at which a smooth transition from cruise control operation to manual accelerator pedal operation will occur. All embodiments described above are capable of performing this function, and thus the cruise control operation will be described with reference to the generic embodiment shown in FIG. 2. The primary difference between utilizing the mechanism 30 for kick-down notification and for cruise control cancellation is the instructions given to the mechanism 30 by the ECU 12.

As with the above embodiments, the plunger 32 of the mechanism 30 moves laterally within the base portion 31. The motion of the plunger 32 within the base portion 31 is described in detail with reference to the above embodiments. However, when operating the mechanism 30 with a cruise control system, the ECU 12 does not adjust the plunger 32 position to the kick-down pedal position. Rather, the ECU 12 adjusts the plunger 32 to the pedal arm 20 position at which a smooth transition from cruise control operation to manual accelerator pedal operation will occur. A smooth transition is provided when throttle continuity exists between the cruise control operation state and the manual accelerator pedal operation state.

Thus, as the vehicle 1 is driven in cruise control operation, the ECU 12, considering the above discussed operating conditions, calculates the pedal arm 20 position required for throttle continuity. The pedal arm 20 position required for throttle continuity is the pedal arm 20 position at which, with the pedal arm 20 situated in said position, cruise control operation can be cancelled with no change in speed or throttle opening. The ECU 12 calculates this position and will continually move the plunger 32 laterally such that the plunger 32 tip facing the pedal arm 20 is situated in this position.

In operation, the accelerator pedal is in the start position A during cruise control operation. Prior to cruise control cancellation, the driver depresses the accelerator pedal until the pedal arm 20 abuts the plunger 32. The plunger 32 will then provide a resistance to additional pedal arm 20 depression. Once the accelerator pedal arm 20 is depressed to this point, cruise control operation can be cancelled with no change in speed or throttle opening.

It should also be apparent that the present invention can be used for both kick-down notification and for facilitating cruise control cancellation. When the vehicle 1 is operating in cruise control, the driver does not need notification of a pending kick-down. Thus, when the vehicle is operating in cruise control, the ECU 12 has the sole concern of adjusting the plunger 32 to the position corresponding to a smooth transition upon cruise control cancellation. When the vehicle is in manual accelerator pedal operation, the pedal arm 20 position at which a smooth transition will occur upon cruise control cancellation is not an issue. Thus, during manual accelerator pedal operation, the ECU 12 has the sole concern of adjusting the plunger 32 to the kick-down pedal arm 20 position.

What is claimed is:

1. An adaptive position detent mechanism for use in a drive-by-wire throttle system, the drive-by-wire throttle system including an accelerator pedal and a control portion, the control portion determining a pedal position at which a transmission kick-down will occur, the mechanism comprising:
    a housing defining an opening at an end of the housing facing the accelerator pedal;
    a plunger portion slidably movable within the housing opening so as to permit at least a head of the plunger to extend from the housing opening;
    a plunger driver configured to slidably move the plunger portion within the housing opening and to hold the plunger portion in any position relative to the housing opening;
    a controller for actuating the plunger driver to move and hold the plunger portion in a position that corresponds to the determined pedal position at which the transmission kick-down will occur; and
    a biasing member biasing the plunger portion in a direction opposite to a direction of pedal depression so as to resist pedal depression beyond said pedal position at which the transmission kick-down will occur.

2. The adaptive position detent mechanism according to claim 1, wherein the plunger driver is a linear solenoid, and the biasing member is a coil spring that engages the housing at a proximal end and the plunger at a distal end so as to bias the plunger toward the accelerator pedal.

3. The adaptive position detent mechanism according to claim 1, wherein the plunger portion further comprises a plunger shaft and a plunger tip, wherein the plunger tip is slidably received within the plunger shaft with at least a portion of the plunger tip extending from the plunger shaft, and the biasing member urges the plunger tip to extend further from the plunger shaft, and wherein at least a portion of the plunger tip extends from the housing opening.

4. The adaptive position detent mechanism of claim 3, wherein plunger driver comprises a motor and a rack disposed within the housing portion, wherein the rack is driven by the motor and the rack is affixed to the plunger shaft at a distal end of the rack such that the plunger portion is moved integrally with the rack, and wherein the drive unit moves the rack so as to position the plunger tip at a pedal position at which transmission kick-down will occur.

5. The adaptive position detent mechanism according to claim 3, wherein the plunger driver comprises a motor disposed within the housing portion at a housing end opposite the housing opening, the motor comprising a screw drive unit and a screw shaft, wherein the screw shaft is in threaded engagement with an opening in the screw drive unit and is received within the screw drive unit so as to be laterally movable by the screw drive unit rotating the screw shaft, the screw shaft is affixed at a distal end to the plunger shaft such that as the screw shaft is moved laterally by the screw drive unit, the plunger portion and the screw shaft move integrally, wherein the screw drive unit moves the screw shaft so as to position the plunger tip at a position at which transmission kick-down will occur.

6. The adaptive position detent mechanism according to claim 1, wherein the plunger portion comprises:
   a hollow plunger shaft housing a plunger pin and a pin biasing mechanism biasing the plunger pin to extend from the shaft housing toward the accelerator pedal,
   wherein the plunger shaft includes at least one shaft detent and the plunger pin includes at least one pin detent,
   wherein the plunger shaft is moved by the plunger driver and positioned such that the plunger pin position corresponds to the pedal position at which a transmission kick-down will occur,
   wherein depression of the accelerator pedal past the position at which a transmission kick-down will occur causes the tip detent and shaft detent to engage and temporarily require an increased force to continue depression of the accelerator pedal.

7. The adaptive position detent mechanism according to claim 1, wherein the pedal position at which the transmission kick-down will occur varies.

8. The adaptive position detent mechanism according to claim 1, wherein the controller is configured to actuate the plunger driver to move the plunger portion to and hold the plunger portion in any position relative to the housing portion in response to variance of the determined pedal position at which the transmission kick-down will occur.

9. An adaptive pedal force-feedback device for use in a drive-by-wire throttle system, the drive-by-wire throttle system including an accelerator pedal, the device comprising:
   a control portion configured to determine a pedal position at which a force feedback is to be provided;
   a plunger slidably provided in a housing such that a tip of the plunger extends from the housing toward the accelerator pedal;
   a biasing means biasing the plunger toward the accelerator pedal; and
   a plunger driver controlled by the control portion to adjust a slidable position of the plunger within the housing to correspond to the pedal position at which force feedback is to be provided, wherein the determined pedal position at which the force feedback is to be provided varies based on vehicle operation.

10. The adaptive pedal force-feedback device according to claim 9, wherein the pedal position at which a force-feedback is to be provided corresponds to one of a pedal position at which a transmission kick-down will occur and a pedal position corresponding to cruise control operation.

11. The adaptive pedal force-feedback device according to claim 9, wherein the plunger driver is a linear solenoid.

12. The adaptive pedal force-feedback device according to claim 9, wherein the driver comprises a motor and a rack disposed within the housing, wherein the rack is driven by the motor and the rack is affixed to the plunger such that the plunger integrally moves with the rack, and wherein the motor is controlled by the control portion to move the rack so as to position the tip of the plunger at the pedal position at which force-feedback is to be provided.

13. The adaptive pedal force-feedback device according to claim 9, wherein the driver comprises a motor disposed within the housing, the motor comprising a screw drive unit and a screw shaft, wherein the screw shaft is in threaded engagement with an opening in the screw drive unit and is received within the screw drive unit so as to be laterally movable by the screw drive unit rotating the screw shaft, and
   the screw shaft is affixed at a distal end to the plunger such that as the screw shaft is moved laterally by the screw drive unit, the plunger portion and the screw shaft move integrally, wherein the screw drive unit moves the screw shaft so as to position the tip of the plunger at the pedal position at which force-feedback is to be provided.

14. The adaptive pedal force-feedback device according to claim 9, wherein the plunger comprises:
   a hollow plunger shaft housing a plunger pin and a biasing mechanism biasing the plunger pin to extend from the shaft housing toward the accelerator pedal,
   wherein the plunger shaft includes at least one shaft detent and the plunger pin includes at least one pin detent,
   wherein the plunger shaft is moved by the driver and positioned such that the plunger pin position corresponds to the pedal position at which force-feedback is to be provided,
   wherein depression of the accelerator pedal past the position at which force-feedback is to be provided causes the tip detent and shaft detent to engage and temporarily require an increased force to continue depression of the accelerator pedal.

15. The adaptive pedal force-feedback device according to claim 9, wherein the pedal position at which force feedback is to be provided varies.

16. The adaptive pedal force-feedback device according to claim 9, wherein the control portion is configured to determine the pedal position at which the force feedback is to be provided based on vehicle operation.

17. An adaptive pedal force-feedback device for use in a drive-by-wire throttle system, the drive-by-wire throttle system including an accelerator pedal, the device comprising:
   a control portion configured to determine a pedal position at which a force feedback is to be provided;
   a plunger slidably provided in a housing such that a tip of the plunger extends from the housing toward the accelerator pedal;
   a biasing means biasing the plunger toward the accelerator pedal; and
   a plunger driver controlled by the control portion to adjust a slidable position of the plunger within the housing to correspond to the pedal position at which force feedback is to be provided, wherein the control portion is configured to continuously determine and adjust the pedal position at which the force feedback is to be provided.

* * * * *

UNITED STATES PATENT AND TRADEMARK OFFICE
CERTIFICATE OF CORRECTION

| | | |
|---|---|---|
| PATENT NO. | : 7,971,506 B2 | Page 1 of 1 |
| APPLICATION NO. | : 11/850768 | |
| DATED | : July 5, 2011 | |
| INVENTOR(S) | : Michael T. Dickinson | |

It is certified that error appears in the above-identified patent and that said Letters Patent is hereby corrected as shown below:

Claim 16 should be deleted.

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,971,506 B2 | |
| APPLICATION NO. | : 11/850768 | |
| DATED | : July 5, 2011 | |
| INVENTOR(S) | : Michael T. Dickinson | |

It is certified that error appears in the above-identified patent and that said Letters Patent is hereby corrected as shown below:

Delete the title page and substitute therefore the attached title page showing the corrected number of claims in patent.

Column 12, lines 38-41, Claim 16 should be deleted.

This certificate supersedes the Certificate of Correction issued April 17, 2012.

Signed and Sealed this
Eighth Day of May, 2012

David J. Kappos
*Director of the United States Patent and Trademark Office*

(12) United States Patent
Dickinson (10) Patent No.: US 7,971,506 B2
(45) Date of Patent: Jul. 5, 2011

(54) AUTOMOTIVE ACCELERATOR PEDAL WITH ADAPTIVE POSITION KICK-DOWN DETENT

(75) Inventor: Mike Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 804 days.

(21) Appl. No.: 11/850,768

(22) Filed: Sep. 6, 2007

(65) Prior Publication Data
US 2009/0069155 A1  Mar. 12, 2009

(51) Int. Cl.
G05G 1/38 (2008.04)

(52) U.S. Cl. ............... 74/512; 74/513; 74/527; 74/560; 200/61.89

(58) Field of Classification Search .......... 74/512, 74/513, 527, 560; 477/133, 136, 141; 200/61.89, 200/86.5, 16 A, 16 D, 520
See application file for complete search history.

(56) References Cited

U.S. PATENT DOCUMENTS

| | | | | |
|---|---|---|---|---|
| 4,316,065 A | * | 2/1982 | Rupp et al. | 200/61.89 |
| 4,818,036 A | * | 4/1989 | Reinecke | 303/50 |
| 5,162,625 A | * | 11/1992 | Comerford | 200/61.89 |
| 5,563,355 A | * | 10/1996 | Plutaet al. | 73/862.625 |
| 5,934,152 A | * | 8/1999 | Aschoff et al. | 74/513 |
| 6,209,418 B1 | | 4/2001 | Kalsi et al. | |
| 6,360,631 B1 | * | 3/2002 | Wortmann et al. | 74/513 |
| 6,418,813 B1 | | 7/2002 | Lewis | |
| 6,446,500 B1 | | 9/2002 | Marquardt et al. | |
| 6,689,016 B2 | | 2/2004 | Apel | |
| 6,805,022 B1 | | 10/2004 | Steindl et al. | |
| 6,896,640 B2 | | 5/2005 | Kurabayashi | |
| 6,955,103 B2 | | 10/2005 | Crack | |
| 7,017,443 B2 | | 3/2006 | Kalsi | |
| 7,066,049 B2 | | 6/2006 | Reimann et al. | |
| 2005/0097980 A1 | * | 5/2005 | Menzies | 74/512 |

FOREIGN PATENT DOCUMENTS

JP 2005-126022 5/2005

* cited by examiner

*Primary Examiner* — Richard W Ridley
*Assistant Examiner* — Thomas Diaz
(74) *Attorney, Agent, or Firm* — Mark E. Duell; Rankin Hill & Clark LLP (57) ABSTRACT

An adaptive position kick-down detent mechanism for providing a force feedback to an operator of a vehicle through a drive-by-wire accelerator prior to the transmission performing a kick-down. The kick-down detent mechanism includes a plunger portion, a plunger driving device, and an elastic portion. The plunger portion is slidable within the plunger driving device and is biased by the elastic portion. An electronic control unit communicates a kick-down pedal position to the plunger driving device, which moves the plunger portion to the kick-down pedal position so that the force feedback is provided to the driver before the kick-down even as the kick-down pedal position changes during vehicle operation.

16 Claims, 5 Drawing Sheets